July 12, 1966  A. P. MORREALE ETAL  3,260,914
SERVO MOTOR

Filed July 1, 1963  3 Sheets-Sheet 1

OPERATION SEQUENCE

| SWITCH POSITION | VECTORS | MOTION θ | ANGLE |
|---|---|---|---|
| 1 | 1 | 0 | 0° |
| OFF | 1 & 2 | CCW $\theta_1 < 90°$ | |
| 2 | 3 | CCW $\theta_2 > 90°$ | 180° |
| OFF | 3 & 4 | CCW $\theta_3 < 90°$ | |
| 1 | 1 | CCW $\theta_4 > 90°$ | 360° |
| OFF | 1 & 2 | CCW $\theta_5 < 90°$ | |
| 2 | 3 | CCW $\theta_6 > 90°$ | 540° |
| | | | = |
| | | | 180°·N° |

INVENTORS
ANTHONY P. MORREALE
KATUMI EGAWA
BY
Albert M Herzig
ATTORNEYS

CCW CONFIGURATION

OPERATION SEQUENCE

| SWITCH POSITION | VECTORS | MOTION $\theta$ | ANGLE |
|---|---|---|---|
| 1 | 1 | 0 | 0° |
| OFF | 1 & 2 | CCW $\theta_1 < 90°$ | |
| 2 | 3 | CCW $\theta_2 > 90°$ | 180° |
| OFF | 3 & 4 | CCW $\theta_3 < 90°$ | |
| 1 | 1 | CCW $\theta_4 > 90°$ | 360° |
| OFF | 1 & 2 | CCW $\theta_5 < 90°$ | |
| 2 | 3 | CCW $\theta_6 > 90°$ | 540° |
| | | | - |
| | | | - |
| | | | 180°·N° |

INVENTORS
ANTHONY P. MORREALE
KATUMI EGAWA
BY
*Albert M. Herzig*
ATTORNEYS

July 12, 1966  A. P. MORREALE ET AL  3,260,914
SERVO MOTOR

Filed July 1, 1963  3 Sheets-Sheet 3

INVENTORS
ANTHONY P. MORREALE
KATUMI EGAWA
BY
Albert M. Herzig
ATTORNEYS

United States Patent Office 3,260,914
Patented July 12, 1966

3,260,914
SERVO MOTOR
Anthony P. Morreale, 9908 Lampson St., Whittier, Calif., and Katumi Egawa, 4055 E. Slauson Ave., Maywood, Calif.
Filed July 1, 1963, Ser. No. 291,702
1 Claim. (Cl. 318—443)

This invention relates to a novel and improved servo motor operated by a single switch which is adaptable as a step servo motor or as a constant speed D.C. motor.

The motor is one which is of simplified construction employing windings controlled by a single switch which in a preferred form of the invention is a single pole double throw switch. The windings are connected in such a way with capacitors that the rotor movement bears a fixed directional relation to the switch position of the single controlling switch. For each switch position the rotor makes a fixed predetermined movement which is positive and from which it will not overrun. The motor inherently involves a characteristic which predetermines the direction of rotation and with the single controlling switch moved between its positions, the rotor will rotate continuously in one direction. When the switch is operated rapidly, the rotor operates as a commutatorless, brushless constant speed D.C. motor. The speed is accurately constant and proportional to the switch movement or the frequency of the input pulses, which may be provided from various types of sources as described more in detail hereinafter.

The motor of this invention has many valuable and useful characteristics which will be better understood from the detailed description of preferred embodiments.

Further objects and many additional advantages will become apparent from the following detailed description of preferred embodiments and discussion of the novel characteristics of the motor.

FIGURE 1 of the drawing is a schematic view of a preferred form of the invention;

Figures 1, 2:
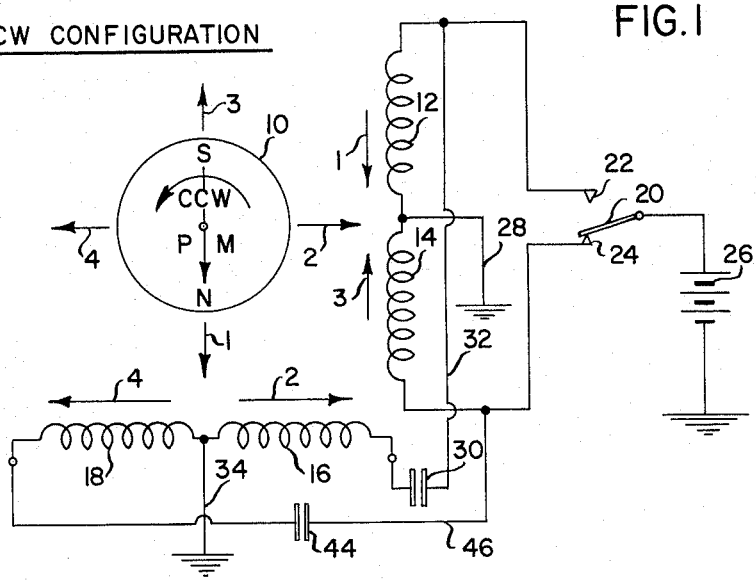
FIGURE 2 is a tabulation showing the motor movements at various switch positions.

A preferred form of the invention is shown in FIGURE 1 which diagrammatically shows a brushless, commutatorless D.C. motor having a rotor of the solid permanent magnet type. The arrangement of the poles and windings may be any of various configurations in which the windings are arranged to produce radial force vectors. The motor may have various physical configurations, an exemplary form being shown in FIGURES 5 and 6 and described in detail hereinafter. The motor is shown in FIGURE 1 diagrammatically, the rotor being designated at 10 with four windings 12, 14, 16 and 18 which may be arranged in quadrature, this is, at 90 degree intervals, around the rotor.

The motor is controlled and driven entirely from a single pole, double throw switch having a blade 20 and contacts 22 and 24. The source of power is shown as a battery 26. When blade 20 engages contact 22, the winding 12 is energized to ground through the wire 28. When switch blade 20 initially engages contact 22, condenser 30 is energized through the wire 32, this condenser being in series with winding 16 connected to ground through wire 34. The winding 16 produces a momentary force vector 2 while the condenser is charging. When condenser 30 is charged no further current passes through the winding 16.

In this static condition the force vector 1 produced holds the motor in position 1; (i.e.) there is no motion and the motor angle is zero as shown in the tabulation, FIGURE 2.

When the switch blade 20 disengages from contact 22 and moves toward contact 24, momentarily, it does not engage either contact. Winding 12 is de-energized. Condenser 30 discharges through winding 16 producing a transient field producing a force vector 2. Forced vectors 1 and 2 combine producing motion of the rotor in a counter-clockwise direction through an angle which is less than 90 degrees, but enough to insure a positive direction of rotation of the rotor. This occurs while the field is disappearing around winding 12.

When the switch blade 20 engages contact 24, the winding 14 is energized producing a force vector 3. Condenser 44 is energized through the wire 46, in series with winding 18. Condenser 44 charges and winding 18 produces a momentary force vector 4. Vector 3 produces continued rotation of the rotor beyond the initial movement (i.e.) more than 90 degrees and the rotor moves to a position at 180 degrees (from the initial zero degree position). This is the third position on the table of FIGURE 2 in which vector 3 is establishing the 180 degree position of the rotor. The motor shown moves in 180 degree steps in one direction, and each position is fixed relative to switch position.

When the switch blade 20 is moved away from contact 24, winding 14 is de-energized, and condenser 44 discharges through winding 18, which is a transient field causing movement of the rotor through an angle which is less than 90 degrees. This transient field is established while condenser 44 is dischcarging and the field is breaking down in winding 14.

When switch blade 20 is back in engagement with contact 22, vector 1 is re-established by energization of winding 12 and the rotor is now rotated to a 360 degree position (i.e.), back in the zero degree position.

Upon repeating the above cycle the rotor moves cyclically or repetitively through the remaining part of the table shown in FIGURE 2 (i.e.), it rotates counterclockwise in 180 degree steps.

Figures 3, 4:
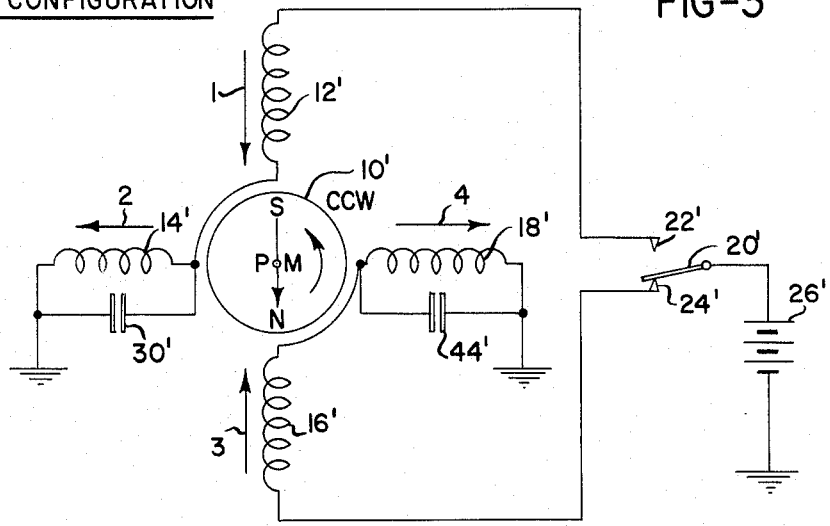
FIGURE 3 is a schematic view of a modified form of the invention.
FIGURE 4 is a tabulation showing the motor's movements of the motor of FIGURE 3 at various switch positions.

FIGURE 3 shows a modified form of the invention which is different in the respect that the circuitry is slightly modified. Similar parts are indicated by reference numerals which are primed. In the circuitry of this form of the invention, windings 12' and 14' are connected in series and condenser 30' is across the winding 14'. Windings 16' and 18' are in series and condenser 44' is across the winding 18'. The motor of this figure operates in accordance with the table of FIGURE 4. The main difference in this form of the invention is that two transient fields are produced instead of one for more positively establishing the direction of rotation of the rotor.

In FIGURE 3 when the switch blade 20' engages the contact 22' the windings 12' and 14' are energized in series to ground. Winding 12' produces force vector 1. Condenser 30' across winding 14 charges up, and winding 14' after condenser 30 is charged, produces force vector 2. The rotor is in a zero position at angle zero degrees, which is established by vectors 1 and 2 half way between them.

When the switch blade 20' is moved away from contact 22' and is between the contacts, these windings are de-energized. The condenser 30' discharges through the winding 14' producing a transient field, that is a force vector, with which the motor tries to align itself moving in a counterclockwise direction through an angle less than 90 degrees.

When the switch blade 20' engages the contact 24', windings 16' and 18' are energized in series, producing vectors 3 and 4 so that there is counterclockwise rotation through an angle of greater than 90 degrees so that the rotation of the rotor is to the 180 degree position. Condenser 44 charges up. When switch blade 20' disengages from contact 24' the windings 16' and 18' are de-energized. Condenser 44' discharges through the winding 16'. Vectors 3 and 4 are present and there is counterclockwise rotation through an angle of less than 90 degrees, insuring rotation in the counterclockwise direction.

When switch blade 20' again engages contact 22' vectors 1 and 2 are re-established and there is counterclockwise rotation of the rotor through an angle greater than 90 degrees and the rotor moves to the 360 degree position or one complete revolution. Upon further switch actuation, the cycle is repeated in accordance with the table.

From the foregoing, those skilled in the art will observe that the invention offers many possibilities for different uses and applications. The rotor is a commutatorless, brushless D.C. motor which operates at constant speed or at an accurately regulated speed. It is controlled entirely by the switch which is external to the motor. It eliminates commutation problems in a D.C. motor. On the other hand, the motor has the advantages of an A.C. induction motor in that it will operate at a constant speed determined by the rate at which the controlling switch is operated, or in accordance with the frequency of applied pulses. It is adaptable to wide ranges of controlling pulse rates and proportionate speeds. By adjusting the pulse rate that is fed to the motor, the motor can be operated and controlled by any exact speed responding exactly to the pulse rate.

Furthermore, the motor is a servo motor controlled by the single controlling switch. The movement is exact in response to the controlling switch, the circuit being an automatically closed loop. Immediately upon excitation of the motor through the controlling switch, it locks immediately in synchronism.

The motor might be controlled by any frequency source or a pulsating source that might be crystal controlled.

It is to be recognized also that the motor is a digital to analog converter. That is, the motor takes a fixed position (i.e.), there is a fixed movement for every action of the controlling contacts. In a four pole motor as shown, for every contact position, the motor moves through 180 degrees and is held there. The direction of movement is positively determined and is in the same direction no matter which of the contacts the blade 20 engages. This comes about as explained in the foregoing by reason of the transient field established when the switch blade is between the contacts. For example, the motor might be controlled to rotate in one direction from a source of pulses providing pulses at the rate of 100 per second. Switch mechanism 20, 22, 24, could be a multivibrator circuit supplying pulses at a predetermined rate to the motor. The rotation is synchronized rotation, synchronized with the pulsing electrical supply and proportional to the frequency.

In the diagrammatic view shown, the motor is shown as having four poles and one which moves in 180 degree increments. It may be provided similarly with other numbers of poles and similar wiring so that the increments of movement would be not 180 degrees but smaller fractions of a complete revolution as desired. There may be any number of windings and poles. The rotor may be a solid permanent magnet type as stated or it may be a multiple salient pole variable reluctance type motor.

Figure 5:
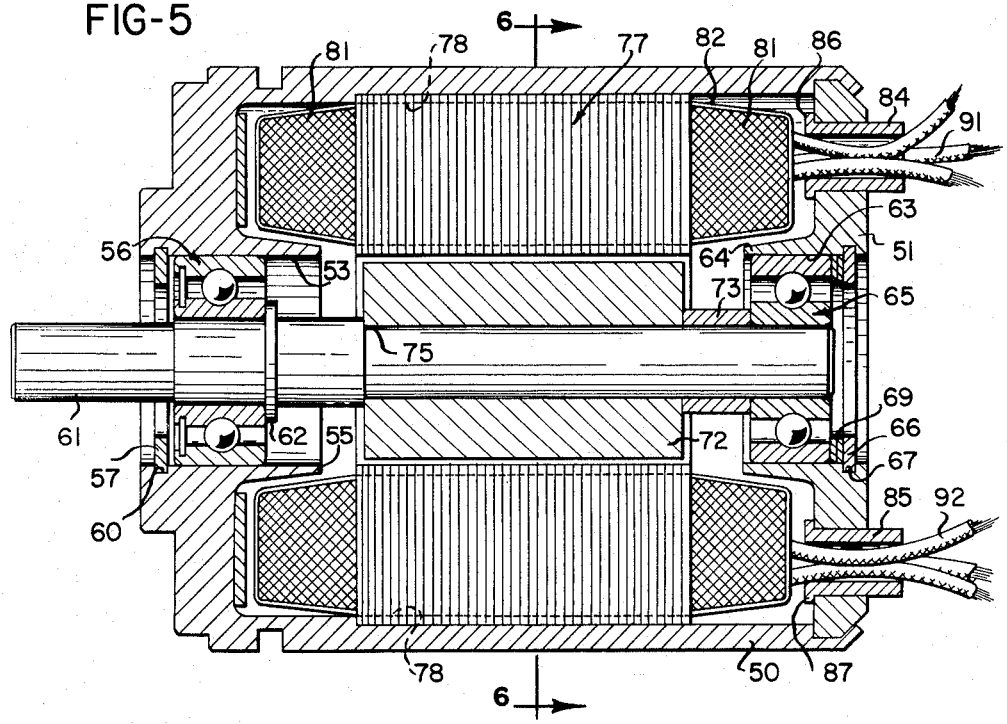
FIGURE 5 is a sectional view of a type of motor in which the invention may be embodied.
Figure 6:
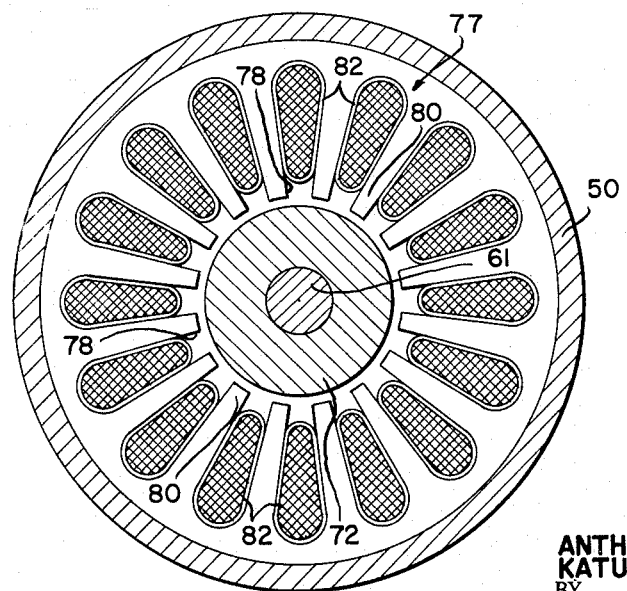
FIGURE 6 is a sectional view taken along line 6—6 of FIGURE 5.

FIGURES 5 and 6 show a typical type of motor construction in which the invention may be embodied, by way of example. Numeral 50 designates a generally cylindrical housing having an end plate 51. One end of the housing has a bore 53 provided in part by an inwardly extending embossment 55. Mounted in this bore is a bearing 56 of conventional type positioned adjacent to a snap ring 57 fitting in an annular groove 60 in the bore 53. Journaled in a bearing 56 is a motor shaft 61 having a flange 62 adjacent to the bearing.

In the end plate 51 there is a bore 63 provided in part by an inwardly extending boss 64. In the bore 63 is a bearing 65 of conventional type and adjacent to it is a snap ring 66 fitting in an annular groove 67 in the bore 63. Provided between the bearing 65 and the snap ring 66 are washers 69. One end of the shaft 61 is journaled in the bearing 65 and positioned between the bearing and the armature 72 is a bushing 73. The armature as shown is of a solid cylindrical permanent magnet type and it engages against a square shoulder 75 formed by a part of the shaft 61 of slightly different diameter, as shown.

Wthin the open space within the housing 50 around the armature there is provided a laminated core as designated at 77 which in the form of the invention shown has a plurality of radial slots 78 formed by inwardly extending projections as designated at 80. The slots 78 are rounded or arcuate and slightly wider at their outer ends. Any suitable number of slots 78, and projections 80 may be provided. The end parts of the windings extend out beyond the core 77 within the housing 50, as shown at 81, and the wires are covered with a suitable material, as designated at 82. The leads from the windings extend out through bushings as designated at 84 and 85 in the end plate 51, these bushings having flanges 86 and 87 at their inner ends. The extending leads to the windings are designated by the numerals 91 and 92.

FIGURES 5 and 6 illustrate the type of construction the motor may have. As explained in the foregoing, when the motor has more than four poles, the step movement is in correspondingly smaller fractions of 360° as explained. Otherwise, the characteristics as described are present. The motor may be constructed as shown in FIGURES 5 and 6 having four poles and windings.

From the foregoing, those skilled in the art will observe that the invention achieves and realizes all of the objects and advantages as outlined in the foregoing as well as having many additional advantages which are apparent from the detailed description.

The foregoing disclosure is representative of a preferred from of the invention and is to be interpreted into an illustrative rather than a limiting sense, the invention to be accorded the full scope of the claim appended hereto.

In addition to the foregoing possible applications of the motor, it is also adaptable for use in counting and integrating. The motor may be used to drive known types of counters or it may be utilized in a system wherein each individual counter wheel is driven by a motor as disclosed herein. In such an arrangement, the first motor operates in steps and after completing a revolution would feed an impulse to the next motor. Such as arrangement would eliminate gear drives between the rotors or counter wheels and indexing to zero would simply be by feeding a command to each rotor to move to the zero position.

I claim:

An electric motor comprising a plurality of windings including two windings spaced at 180° apart, a source of electrical energy for said windings, said windings having relation to the armature of the motor such that the armature has predetermined positions when individual of said two windings are energized, means for individually increasing and decreasing the energization of each of said two windings, means for momentarily energizing other windings at the time of decreasing the energization of said certain windings, said other windings having relationship to the said armature to induce rotation thereof in a given direction whereby as a result of cyclically changing the energization of said two individual windings, the rotor will rotate in a given direction having predetermned static positions associated with energization of each of said two windings, said momentary energizing means, including condenser means associated with said other windings whereby to discharge and individually energize said other windings at the time the energization of one of said two windings or reduced whereby to insure angular movement in a predetermined direction, said condensers being connected in parallel with said other windings.

References Cited by the Examiner

UNITED STATES PATENTS

| | | | |
|---|---|---|---|
| 2,249,029 | 6/1941 | Mullerheim | 310—49 X |
| 2,995,690 | 8/1961 | Lemon | 318—138 |
| 3,077,555 | 2/1963 | Fredrickson | 310—49 X |
| 3,124,733 | 3/1964 | Andrews | 318—138 |

JOHN F. COUCH, *Primary Examiner.*